(12) United States Patent
Sanchez (10) Patent No.: US 10,210,344 B2
(45) Date of Patent: Feb. 19, 2019

(54) SYSTEMS AND METHODS FOR CYBERSECURITY

(71) Applicant: JPS Engineering Corp., San Diego, CA (US)

(72) Inventor: Jorge Sanchez, San Diego, CA (US)

(73) Assignee: JPS Engineering Corp., San Diego, CA (US)

( * ) Notice: Subject to any disclaimer, the term of this patent is extended or adjusted under 35 U.S.C. 154(b) by 0 days.

(21) Appl. No.: 15/727,180

(22) Filed: Oct. 6, 2017

(65) Prior Publication Data

US 2018/0039789 A1 Feb. 8, 2018

Related U.S. Application Data

(63) Continuation-in-part of application No. 15/619,099, filed on Jun. 9, 2017.

(Continued)

(51) Int. Cl.

| H04L 29/06 | (2006.01) |
|---|---|
| G06F 21/62 | (2013.01) |
| G06F 21/45 | (2013.01) |
| G06F 21/53 | (2013.01) |
| G06F 21/56 | (2013.01) |

(Continued)

(52) U.S. Cl.
CPC .......... *G06F 21/6218* (2013.01); *G06F 21/45* (2013.01); *G06F 21/53* (2013.01); *G06F 21/566* (2013.01); *G06F 21/577* (2013.01); *G06F 21/602* (2013.01); *G06F 21/72* (2013.01); *H04L 63/0272* (2013.01); *H04L 63/083* (2013.01); *H04L 63/101* (2013.01); *H04L 63/145* (2013.01); *H04W 4/70* (2018.02); *H04W 12/06* (2013.01); *H04W 12/08* (2013.01); *H04W 12/12* (2013.01); *H04L 63/0428* (2013.01)

(58) Field of Classification Search
CPC ...... G06F 21/6218; G06F 21/45; G06F 21/53; G06F 21/566; G06F 21/577; G06F 21/602; G06F 21/71; H04L 63/0428; H04L 63/0272; H04L 63/083; H04L 63/101
USPC .............................................. 726/23, 27, 29
See application file for complete search history.

(56) References Cited

U.S. PATENT DOCUMENTS

| 7,996,673 B2* | 8/2011 | Ivanov | G06Q 20/383 |
|---|---|---|---|
| | | | 340/5.8 |
| 8,549,295 B2* | 10/2013 | Zhang | H04L 63/0428 |
| | | | 713/169 |

(Continued)

*Primary Examiner* — Jahangir Kabir
(74) *Attorney, Agent, or Firm* — Knobbe Martens Olson & Bear LLP (57) ABSTRACT

The disclosed embodiments provide a method and apparatus for protecting a critical computer system from malware intrusions. An isolator containing access approval features is disclosed. The isolator requires the approval of a Supervisor which can be a person with authority or an intelligent computer before a user can have access to the critical computer system. The isolator contains features used to facilitate cascaded encryption and decryption of messages which further enhances the security of the critical computer system. The isolator can greatly improve security of infrastructure such as industrial control systems, servers and workstations. The disclosed embodiments also provide a set of software and hardware features used to provide detection, prevention and recovery from a Cyber-attack in an Internet of Things installation.

12 Claims, 10 Drawing Sheets

Related U.S. Application Data

(60) Provisional application No. 62/404,844, filed on Oct. 6, 2016, provisional application No. 62/347,998, filed on Jun. 9, 2016.

(51) Int. Cl.
| | |
|---|---|
| *G06F 21/57* | (2013.01) |
| *G06F 21/60* | (2013.01) |
| *G06F 21/72* | (2013.01) |
| *H04W 12/06* | (2009.01) |
| *H04W 12/08* | (2009.01) |
| *H04W 12/12* | (2009.01) |
| *H04W 4/70* | (2018.01) |

(56) References Cited

U.S. PATENT DOCUMENTS

| | | | |
|---|---|---|---|
| 2002/0150243 A1* | 10/2002 | Craft | H04L 63/0823 380/201 |
| 2006/0029228 A1* | 2/2006 | Lagrange | G06F 21/606 380/201 |
| 2012/0174224 A1* | 7/2012 | Thomas | G06F 21/566 726/24 |
| 2017/0222815 A1* | 8/2017 | Meriac | H04L 9/3247 |

\* cited by examiner

Figure 1. Computer System vulnerabilities

Figure 2. Use of Isolator

Figure 3. Isolator Features

Figure 3a. Multi-port interface and gatekeeper embodiment

Figure 4. Critical System Using Isolator

Figure 5. Security Process

SYSTEMS AND METHODS FOR CYBERSECURITY

CROSS-REFERENCE TO RELATED APPLICATIONS

This application is a continuation-in-part of U.S. Patent Application Ser. No. 15/619,099, filed on Jun. 9, 2017, entitled Isolation System for Cybersecurity, which application claims priority to U.S. Provisional Application 62/347,998, filed on Jun. 9, 2016, entitled Integrated Circuit for Cybersecurity. This application also claims priority to U.S. Provisional Application No. 62/404,844, filed Oct. 6, 2016, entitled Cybersecurity Protection for Internet of Things. Each of the above mentioned applications are hereby incorporated to this application in their entireties by reference.

FIELD

The presently disclosed embodiments relate to an apparatus containing various features used to protect a computer, a computer system, or other processing circuitry from external sources of malware that can cause damage and malfunctions. In this specification we will refer to malware as a computer virus, any type of hostile or intrusive software, worms, Trojan horses, ransomware, spyware, adware, scareware, and other malicious computer programs.

BACKGROUND

There are presently several means for protection to keep malware from entering computer systems. Current state of the art solutions use various software means and approaches to protect the computer systems against cyber-attacks and malicious intrusions. The software used, although beneficial in some cases can be corrupted and rendered ineffective whenever cyber intruders discover a new method to confuse the software by exploiting seemingly endless possible points of attack.

Furthermore, the market and installation of IoTs is increasing at a rapid pace with the advent of efficient battery powered electronics, wireless communications cloud computing services and the Internet. Specifically, hardware for present solutions include the utilization of Radio Frequency Identification (RFID) tags, sensors such as temperature, humidity, cameras, pressure sensors, optical fiber, optical devices laser devices, LEDs and photosensors. Software includes firmware embedded in controllers of the IoT hardware, communications software, wireless communication systems, servers, server operating systems and database management systems. An increasing concern is that IoT systems can be subject to Cyber-attacks from an adversary who can take advantage of the diversity and openness of the Internet to conduct damage for no logical reason or to gain some financial advantage. Cyber-attacks could have grave consequences in some IoT systems with large financial losses or potentially harm to humans or animals.

SUMMARY

Unlike protection approaches that rely only on software, the protection solution presented in this disclosure may comprise a combination of hardware and software used to isolate the computer system from the points of entrance of malware. The solution may be arranged in an isolator system. Because the isolator makes extensive use of hardware, it is not confused by malware since it will do only what it is hardwired to do and only that thus ignoring any malware software attempts to perform other malicious functions.

Further embodiments disclosed herein address solutions to the dangers to IoT systems from an adversarial attack. These solutions may include a set of security measures specifically targeted for the points of vulnerability of IoT systems. Security measures embedded in the IoT may include: firmware code obfuscation, use of white lists, machine user ID and token passwords, restricted set of commands, internal buffer controls. Since the IoT System includes communications with a Server, additional features of the IoT hardware and the Server computers may include execution of encrypted protocols to secure the bidirectional wireless communications between the two ends of the IoT System. The Server computer itself may have security measures installed such as malware protection, data at rest encryption and white lists. Some embodiments of the IoT System can benefit from access to the IoT or to the Server by a user by means of a mobile phone or a local computer or laptop. In these situations it may be advantageous to install appropriate software to operate in these hardware devices in order to achieve the needed security protection.

BRIEF DESCRIPTION OF THE DRAWINGS

The nature, objects, and advantages of the embodiments will be clarified with the following detailed description in connection with the accompanying drawings.

DETAILED DESCRIPTION

Any embodiment described herein as an example is not necessarily to be construed as preferred or advantageous over other possible embodiments and arrangements.

Figure 1:
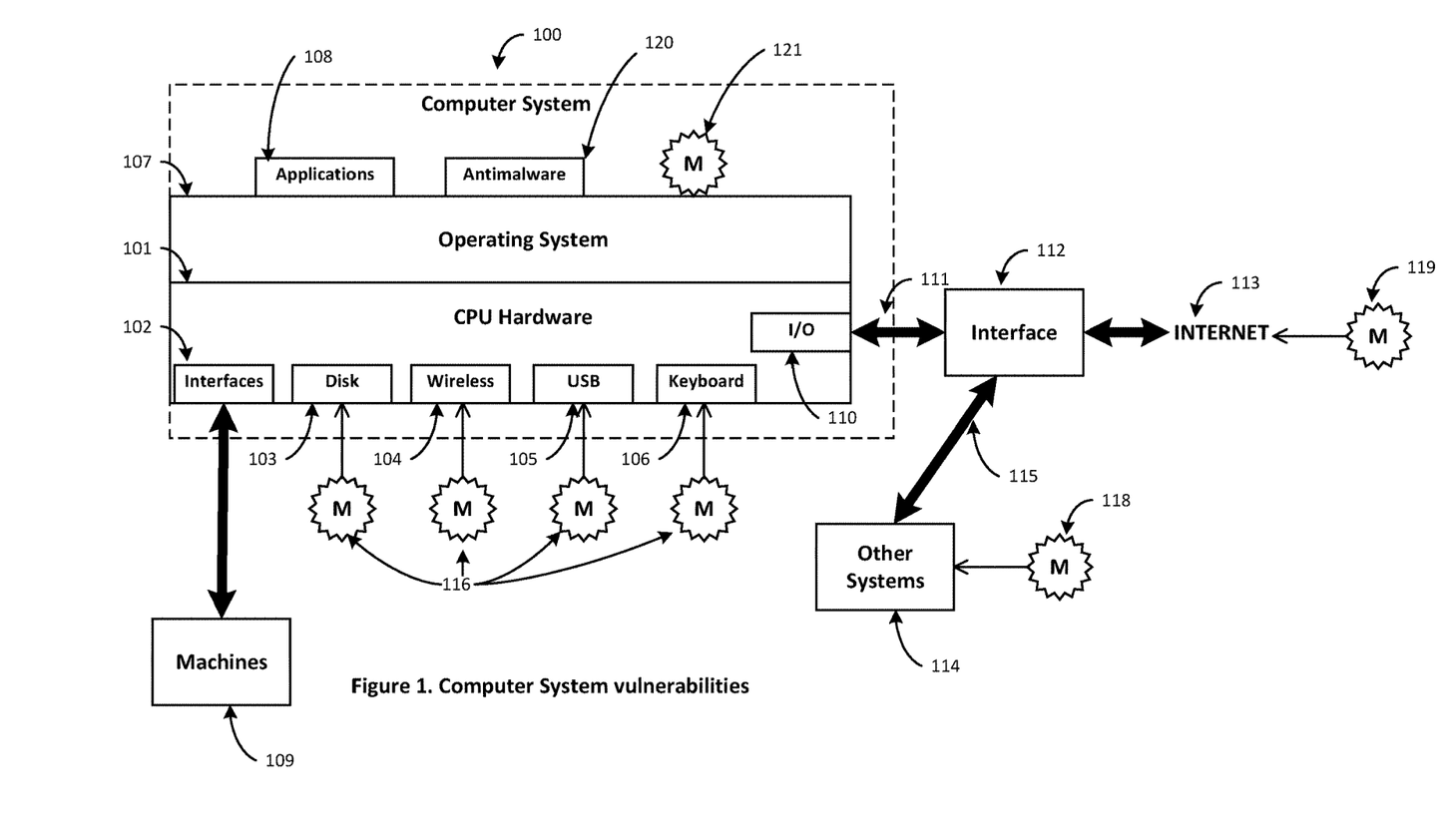
FIG. 1 shows a computer system highlighting its vulnerabilities to malware.

FIG. 1 shows a computer system 100 which includes CPU hardware 101, with interfaces 102, disk drive 103, wireless interface 104, a USB port 105, and a keyboard interface function 106. The computer system operates under the control of an operating system software 107 which can be Windows, Linux, or other. The operating system manages the resources of the computer system. There can be a set of applications 108 installed in the computer system such as a word processor, a database management system, or a scientific program to predict the weather. Variations of this type of computer system architecture are used as servers to provide information to internet users, or for workstations. In the illustration of FIG. 1 we show the computer system interface connected to a set of machines 109, which in this example are used to control infrastructure. An example of infrastructure system is an electricity generating plant or the water management system for a city. Computer systems of this type are known as industrial control systems. The computer system uses an input/output (I/O) port 110 with logic functions to enable the computer system to communicate via a network connection 111 to an Interface 112 consisting of a router or a network controller that manages the communication of the computer system and multiple devices within a network and to the Internet 113. The Interface also allows other systems represented by the block 114 to access the internet using the connection 115. Connections 111 and 115 may conform to certain standards such as Ethernet.

Users of computer systems benefit greatly from modern operating systems and easy to use icons which launch applications with a double click of a mouse. This function eliminated the need to type commands to a computer to start an application or perform a given function. In a similar way there are many functions that work in the background of a computer where the user is generally unaware of the execution of those functions by the operating system. Operating systems have greatly increased the productivity of users and improved the ease of use. At the same time, browser application programs like Chrome and Explorer have greatly enhanced the capability to access information on the World Wide Web. With all of this convenience comes the risk of contracting malware which in the case of servers and industrial control systems a malware attack can make the machinery malfunction with serious consequences measured in financial losses and in endangering lives.

FIG. 1 shows the different points of weakness where malware can penetrate the computer system. An area of vulnerability is the various peripheral components of the computer such as the disk drive 103, wireless connections 104, USB ports 105 and the keyboard 106. The figure illustrates the malware infection 116 entering through those components. For example an infected disk 103 can be inserted into the computer system, or a wireless connection brings in a virus, an operator can connect an infected USB memory module, and a disgruntled operator may introduce a malfunction using the keyboard. Other systems represented at 114 in the network which are controlled by the interface 112 may also be infected from malware 118. Also, the user can access malicious websites which can bring in malware 119 over the internet 113.

When the malware penetrates a computer system it activates itself as an executable program. The operating system allows many executable programs to be active at any one time. To appreciate this, if we type control-alt-delete on a keyboard simultaneously and by selecting the task manager in a windows operating system a window will appear listing the multiplicity of currently active operations. This happens because windows is a multitasking system. Often, malware disguises itself as a legitimate program and begins to perform its invasion of the computer system and over time it takes over the management and operation in order to further its malicious objectives.

The operating system 107 in the computer system 100 will be typically equipped with an antimalware program 120. Even in the best of systems due to the number of possible points of entry and due to the large number of people worldwide with malicious intent eventually malware shown at 121 may get into a computer system. This situation will create havoc until a suitable fix known as an antimalware program 120 is found and the system is cleaned of problems. However, there is a delay of time between the infection getting into the computer system and when a software antidote is found which causes damage to the data and infrastructure the computer system manages. Malware in some cases is so damaging that it will even infect the antimalware programs rendering ineffective, it can also encrypt the data in the computer system subsequently sending a ransom demand to the computer owner before the decryption key is provided. In many cases there is a complete loss of the information which can cause substantial losses. As mentioned, in the case of the industrial control systems consequences can be fatal.

In summary, current computer systems exhibit numerous points of vulnerability, antimalware must constantly be changed under extremely urgent conditions to come up with an antidote to an attack, attacks are generally undetected until after damage is caused somewhere in computer systems, IT workers operating as analysts must keep constant vigilance of computer systems to detect malware resulting in high operating costs, internal and external operators can introduce malware and cause damage.

Figure 2:
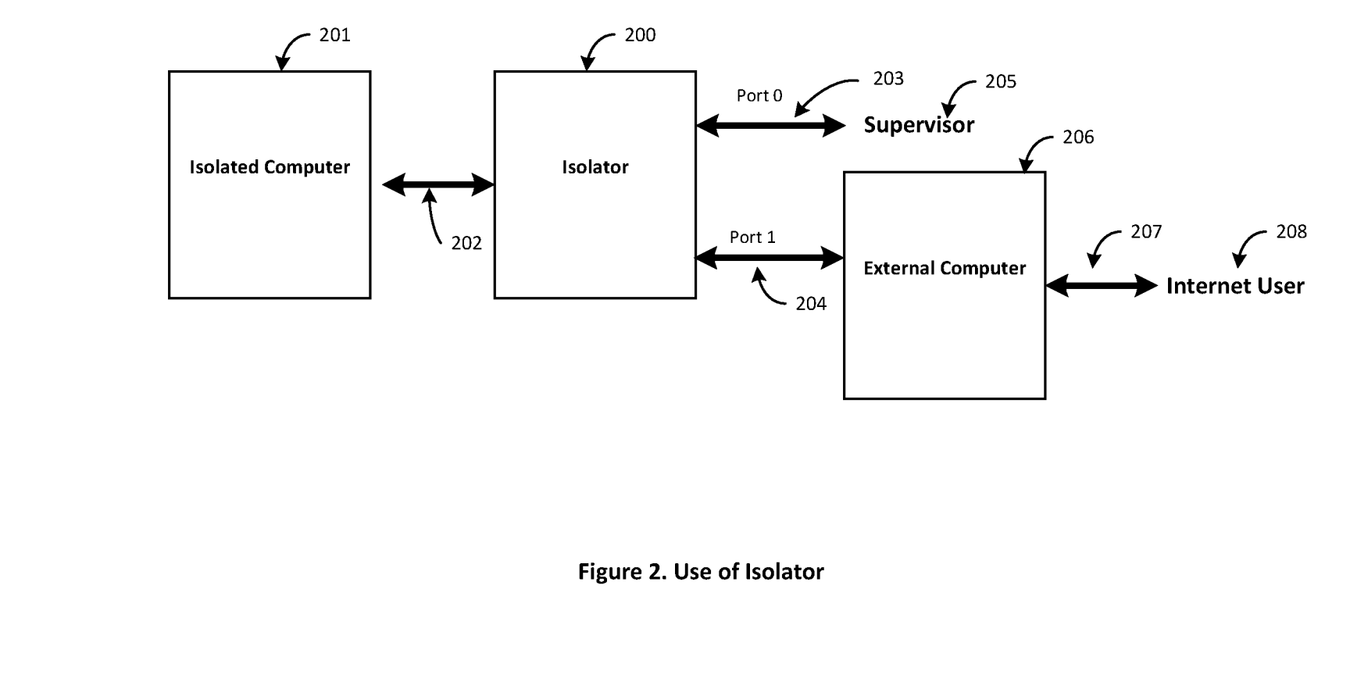
FIG. 2 illustrates the isolator which is the purpose of this invention.

One implementation of a system using an isolator according to some implementations is presented in FIG. 2. The isolator 200 is connected to the computer system to be protected, designated the isolated computer 201 in FIG. 2, by means of an interface connection 202. The isolator has two ports: Port 0 shown as item 203 in the figure, and Port 1 corresponding to 204 in the figure. In this embodiment, Port 1 is connected to a computer which is outside of the area protected by the isolator, named here the external computer 206. The external computer may use interface connection 207 to connect to the internet at 208. In a given application of the isolator, an individual internet user of the external computer may request access to the isolated computer using Port 1 for the purpose of loading an application, to make an update or to manage a change of the operation of a system controlled by the isolated computer. When the access request is detected by the isolator, as part of the vetting process, the isolator verifies the credentials of the user 208. At the same time, an internal timer is triggered to limit the window of time when the access can be approved. A required condition to grant access to the Internet user 208 is that another individual with the appropriate credentials, called in this case the Supervisor 205 is connected to Port 0. The Supervisor is defined as another individual who has a position of authority in the computer installation such as an IT manager or a power plant manager who is ultimately responsible for the correct and safe operation of the computer infrastructure. The Supervisor 205 must provide its own access credentials and if this happens, the isolator approves the access of the user 208 to enter the isolated computer and effect changes. If the Supervisor 205 does not log into the system within a predetermined period of time, or gives the incorrect credentials, the isolator terminates both connections and internally logs the attempt to access for security tracking purposes. The credentials of the user 305 and the Supervisor 205 may be changed periodically to enhance the security. With this feature the probability that an intruder has acquired credentials for both the user 208 and the Supervisor 205 is reduced. As described below, parts of the isolator 200 may be implemented in hardware to increase security.

Figure 3:
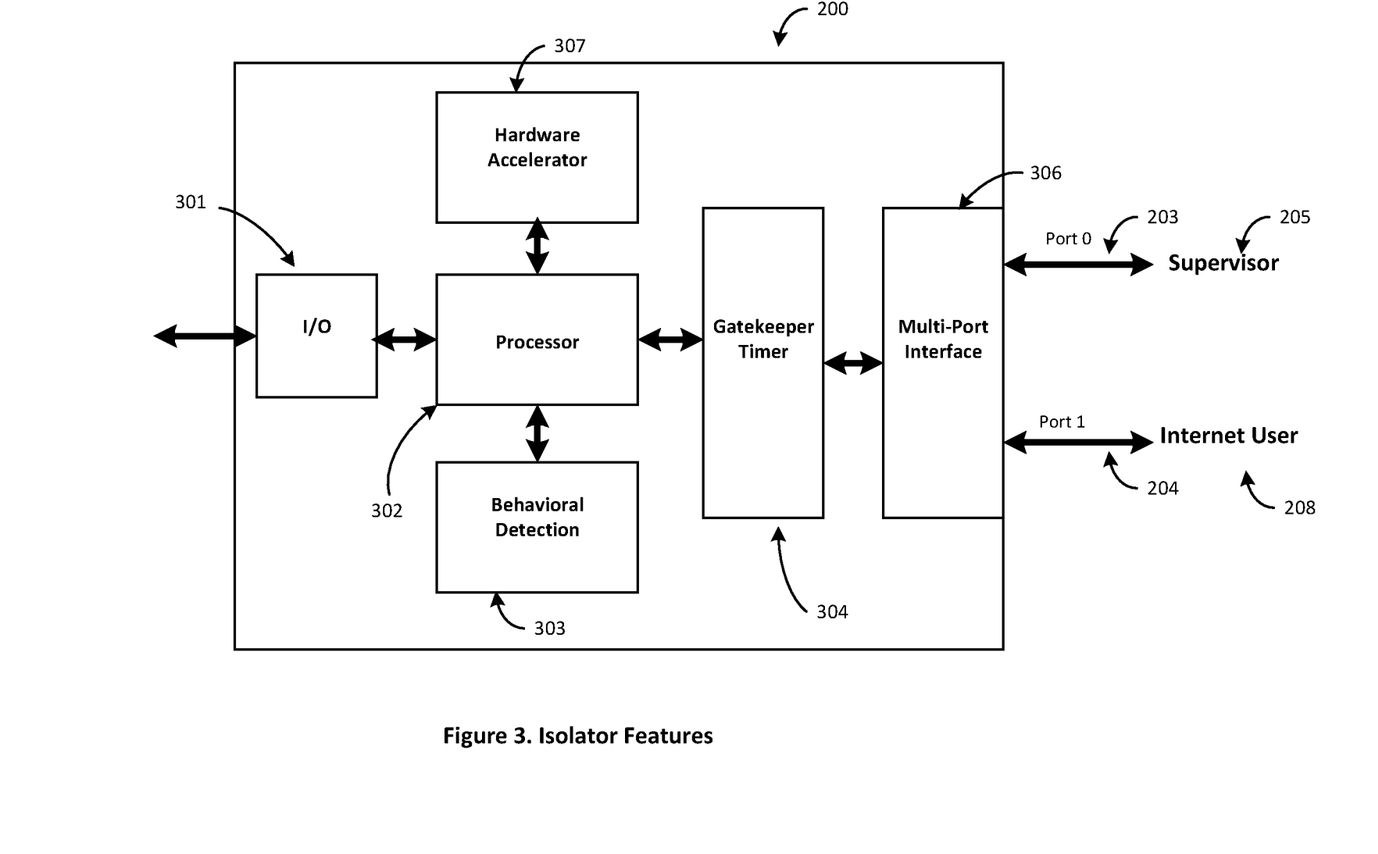
FIG. 3 illustrates in detail the features of the isolator.

FIG. 3 illustrates an implementation of features of the isolator 200. Isolator 200 connects to the isolated computer 201 by means of an input output logic circuit (I/O) 301. The opposite side of the isolator contains a multi-port interface 306 which allows connection to a Supervisor 205 by means of Port 0 connection at 203. Also, an internet user 305 connects to the isolator using Port 1 at 204. The multi-port interface 306 contains the logic necessary to implement the protocol used to connect to the internet user 305 and the Supervisor 205. An example of this protocol is an Ethernet connection. The gatekeeper timer 304 determines the time window within which the isolator can accept access. This unit contains a timer that may be programmable at the time when the isolator is installed. One element of the isolator may be a Processor 302. This portion of the isolator enhances the usefulness of the isolator by carrying out CPU operations needed to detect malware with conventional antimalware software. For this purpose, the Processor may create a sandboxed environment to quarantine and observe the behavior of a given file or program that is intended to be given access to the isolated computer. This can be useful in industrial control systems where is it desirable at times to install an update in the computer system that directs the operation of the industrial control computer such as in a power plant. The operator in this example can be an Internet User 305 such as a computer programmer in the organization who remotely wishes to make a change in the operation of the power plant. The change in operation may be an executable program or a file with instructions. The processor 302 and the behavioral detection block of logic 303 may evaluate the lines of software first before allowing entry into the isolated computer 201. It is possible to also include bypass functionality so that the software instructions can be sent from the gatekeeper timer 304 directly to the isolated computer 201 without evaluation. This may be used in situations where the source of the software is trusted and the software has been previously scrutinized. The Processor 302 can be implemented as a Cryptoprocessor. This is a type of processor where the internal instruction set of the CPU is encrypted in various ways so that it is very difficult to determine what logical sequences of operations the CPU is conducting. There have been many types of Cryptoprocessors built in the past with varying degrees of security, which is dependent on the level of sophistication of the encrypted internal microinstructions of the CPU. Many implementations scramble the logic and the microinstructions in a way that the entire operation is convoluted and is very difficult to determine what the CPU is doing even while monitoring its internal circuits as is known to be done by industrial espionage activities. Its precise operation is only apparent to the designer of the CPU. Others would find it very difficult to discern the operation. The instruction set of the Cryptoprocessor can also be periodically changed so that it is always a step ahead of people with malicious intent. In some embodiments, this may be facilitated by implementing at least some processor functionality with a Field Programmable Gate Array (FPGA).

Another facility that may be contained in the isolator is the hardware accelerator 307. This block of logic may contain hardware multipliers, shifting functions, matrix manipulations and other functions used in encryption. The objective of this function of the isolator 200 is to enable the isolated computer 201 to be able to communicate with external computers using encrypted messages and encrypted data. In this manner, we are able to intensify the level of security since only valid encrypted messages or data can be accepted by the Processor 302. In addition, because we have the assistance of the hardware accelerator 307 it becomes practical to use cascaded encryption. This type of encryption is used when encryption is used on an already encrypted message. This process can be carried our multiple times. Often the issue with cascaded encryption is that it takes a long time to decrypt or encrypt a message. However with an accelerator, the speed at which encryption or decryption is done is substantially reduced. The isolator may be implemented in a set of logic circuits, a Field Programmable Gate Array or in a custom integrated circuit.

Figure 3A:
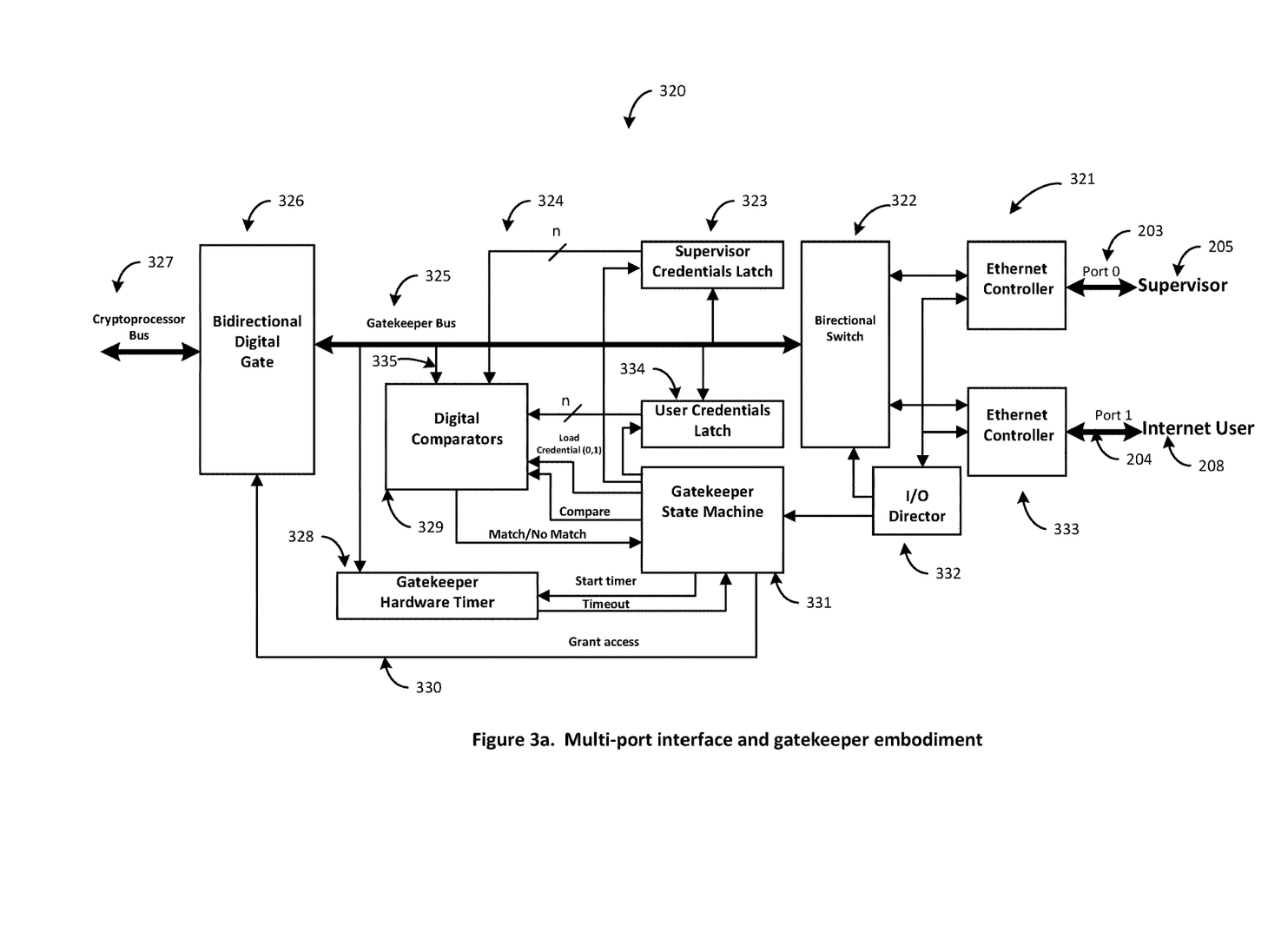
FIG. 3a shows an embodiment of the multi-port interface and the gatekeeper timer logic circuits.

In reference to FIG. 3a a possible embodiment for the multi-port interface and the gatekeeper logic is shown. The diagram shows how the Supervisor input 205 applies its approval input to an Ethernet controller 321 using Port 0 at 203 and the Internet user 305 applies its request for entry into the system to Ethernet controller 333 using Port 1 at 204. In this case we show a two port system, however the isolator can be implemented with a one port system with appropriate modifications of the interface. The outputs from both Ethernet controllers are connected to a bidirectional logic switch 322. The protocol and management of the Ethernet controllers is done by the I/O Director 332. This unit could be implemented with a microcontroller with firmware. A state machine is a control unit that where a set of outputs are a function of a set of inputs and a logic state. The state machine can perform complex operations which may be hardwired and is an ideal candidate for an FPGA implementation. The function of the I/O Director 332, since its operations are fairly focused, it is best to implement the function with a state machine because a state machine adds a higher level of security. This is because a state machine will only perform the operations it is meant to do and will ignore attempts by external software to make it do anything else or to modify its operation. The secondary side of the Bidirectional Switch leads to what is called the Gatekeeper Bus 325 which contains the gatekeeper functionality. The purpose of the gatekeeper is to determine if access to the system is granted to the external sources connected to Port 0 and Port1. Accordingly, the I/O Director 332 conducts the protocol needed to receive the credentials of the Supervisor 205 and the internet user 305 one at a time. Credentials are user name, password and other pin identifier. Each time a credential is routed by the I/O Director to the Gatekeeper Bus, a signal is sent to the Gatekeeper State Machine 331. This block controls all functions needed to authenticate the sources requesting entrance to the system and as its name suggests it is implemented with hardwired logic. Once the I/O Director 333 allows entry to the Internet User its credentials are stored in the User Credential Latch 334. Thereafter the I/O Director will route instead the Supervisor 205 access credentials to the Supervisor Credentials Latch 323. When the credentials for access by the Internet User 305 are received, the Gatekeeper State Machine 331 starts the Gatekeeper Hardware Timer. The Supervisor 205 credentials must be received within a predetermined period of time hardwired into the timer. If the second set of credentials is not received, then the process is terminated and access request is ignored. The two sets of credentials latches contain n bits as shown in FIG. 3a. All of the bits are connected to the Digital Comparators 329 inputs. In the next state, the Gatekeeper State Machine enters internally into the next logic state and activates the Compare input to the Digital Comparators 329 block. The Digital Comparators is made with logic which compares bit by bit the credentials of the Supervisor 205 and the Internet User 305. There is a backdoor used to load new credentials into the Digital Comparators with the connection of the Gatekeeper Bus with the connection shown at 335 and with a unique command sent to the Gatekeeper State Machine 331 by the I/O Director 332 after a code is received from the Supervisor input 305. Once both sets of credentials are verified to be authentic, the Digital Comparators logic block 329 will sent a Match or No Match signal to the Gatekeeper State Machine 331. If there is a match, then the Gatekeeper State Machine will activate Grant Access control line 330 which enables the Bidirectional Digital Gate 326 to allow access to the Cryptoprocessor Bus 327. Is it to be noted that all of these transactions described above may be very fast since most or all of the operations are done with logic hardware and state machines and with a minimal set of sequential operations. There can be a multiplicity or implementations that can be obtained while maintaining the principle objectives of this invention.

Figure 4:
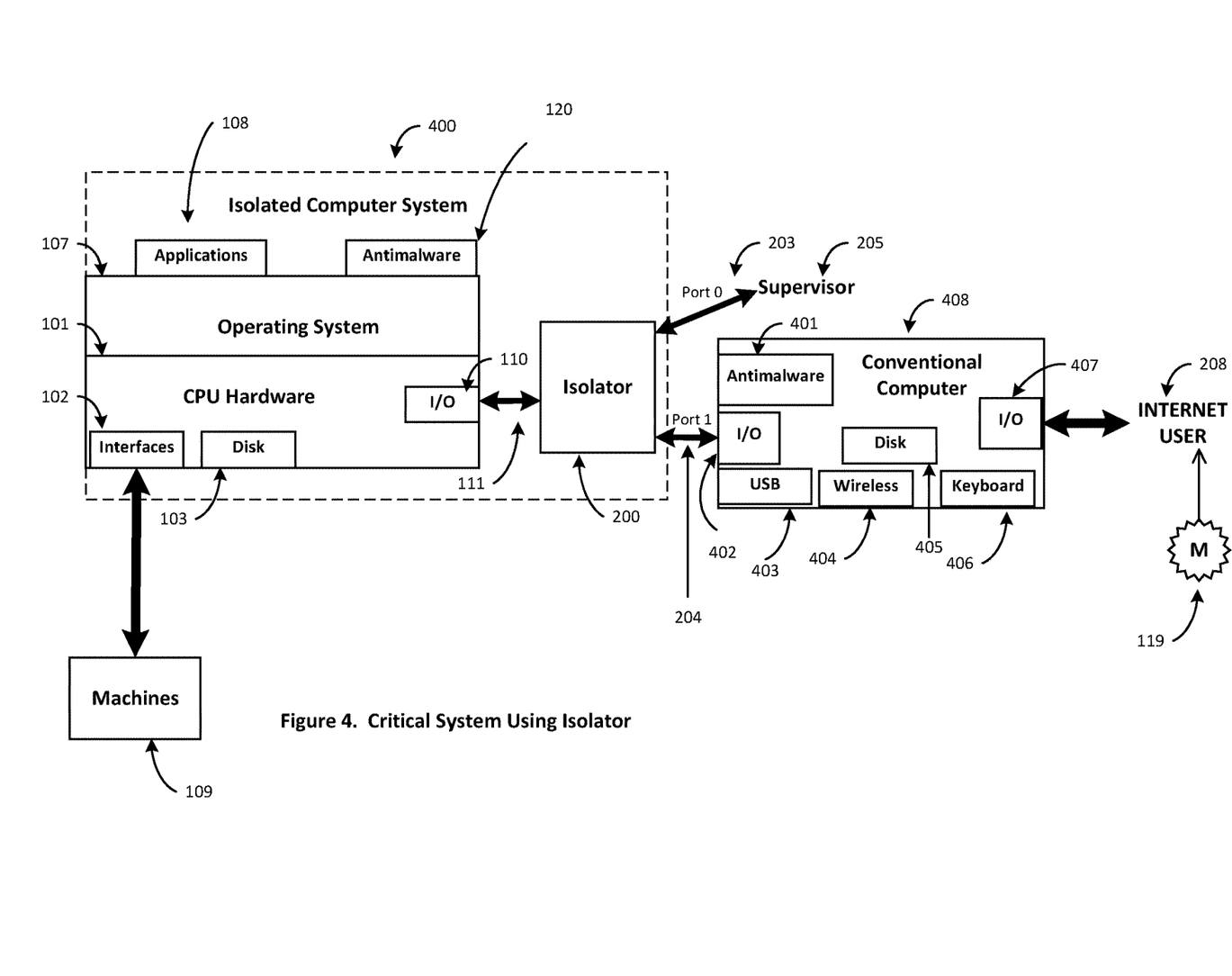
FIG. 4 illustrates an application of the isolator to safeguard a critical computer system.

FIG. 4 is an embodiment showing an application of the isolator used to protect a critical system such as an industrial control system, a server, or a workstation. In this application we applied a suggested policy where we eliminate most of the potential area of malware intrusion which were shown in the computer system of FIG. 1. Therefore the disk 103 used is only the disk used with the system when first built or a new disk with verified software and data. There is no direct wireless interface or a USB port or a keyboard. The way to go in to the workings of the isolated computer system 400 is to go through the isolator. In the isolated computer system 400 we still include connection to machines 109 for various purposes such as an industrial control system, we also will include the necessary applications 108, antimalware 120 and an I/O port 110. As described previously a Supervisor 205 monitors and approves access to the computer though Port 0 at 203. An internet user 208 will have access to the isolated computer system with a conventional computer containing previously described features such as an I/O 402, wireless interface 404, a disk 405 and keyboard 406, and I/O 5407 used to connect to the internet. The I/O 407 may be an Ethernet connection or another protocol. In addition, the conventional computer 408 will also include an antimalware program 401. In this arrangement if a malware attack represented by 119 would have to go through more than one source of filters and will be prevented from entering the isolated computer system by the isolator 200. Even if the conventional computer 408 becomes infected with malware, it is possible to format the disk of this computer, reinstall the operating system and the applications. However, the isolated computer system 400 which operates critical infrastructure will not be affected.

Figure 5:
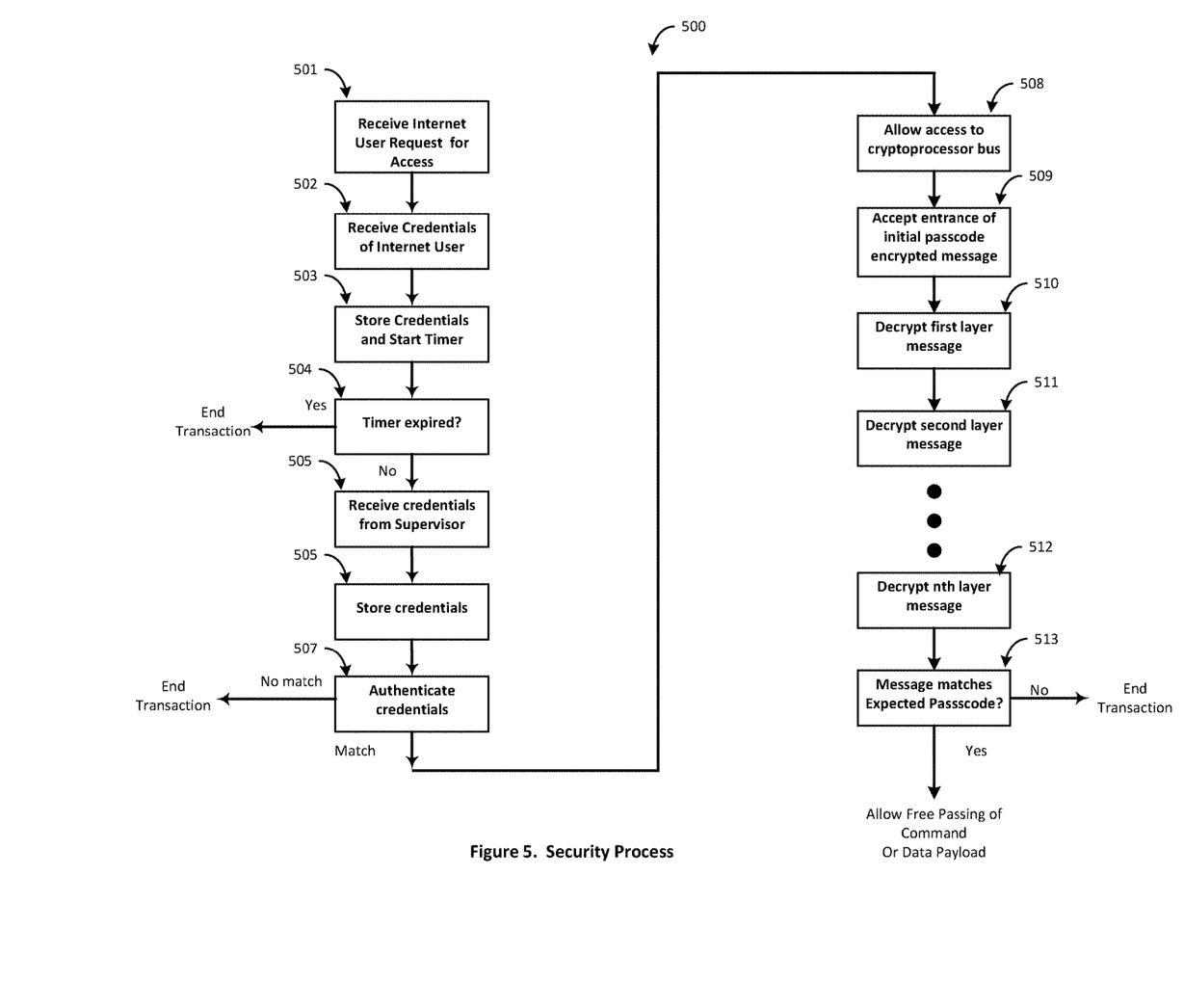
FIG. 5 is a flowchart of the security process.

The Security and authentication process can be best appreciated with the aid of the flowchart in FIG. 5. At 501 we show the step where the request for access from the Internet User 208 is received. In the next step at 502 the access credentials of the Internet User 208 are received and passed on to the Gatekeeper Bus 325 by the hardware in the I/O Director 332, the Gatekeeper State Machine 331 then proceeds to store the credentials of the Internet User 208 in the User Credential latch 334 and start the Gatekeeper Hardware Timer 328. At 504 if the timer expires the Gatekeeper State Machine 331 receives a Timeout signal and the transaction is terminated. If the Supervisor 205 credentials are received before the timer expires then its credentials are passed on to the Gatekeeper Bus 325 and are stored in the Supervisor Credentials Latch 323 triggered by an action taken by the Gatekeeper State Machine 331. In step 507 the Gatekeeper State Machine 331 proceeds to command the Digital Comparators to compare the credentials with previously stored credentials to authenticate both the request from the Internet User 208 and the Supervisor 205. If both credentials do not match, the transaction is terminated. If the credentials are authenticated, then the Gatekeeper State Machine 331 allows access to the Cryptoprocessor Bus 327 by enabling a gate in the Bidirectional Digital Gate 326. This step is shown at 508.

We then follow the security process with a secondary optional process where an encrypted secret message is sent by the Internet User 208 who wants access to the computer system. The secret message is decrypted at the Processor 302 and if the decrypted message matches a previously stored secret message stored in the Processor 302 then authentication is determined to be positive. The encrypted secret message can be any message such as a long sentence or a chosen passage of a book.

For a higher level of security, the encrypted secret message may be encrypted in multiple layers of encryption at the Internet User's computer with multilayer encryption. This is done with a set of encryption keys that match decryption keys stored in the Processor 325 memory which are used to decrypt the message received. Multilayer encryption is a process whereby a first message is encrypted, then a second encryption is done on the results with a second encryption key. The process is repeated multiple times each time with a different encryption key. The encryption keys and the encrypted message are stored in the semi-permanent memory of Processor 302. Normally multiple encryption is time consuming and is not used as much because of time delays. In our case we have added a Hardware Accelerator 307 which facilitates the operations. The Hardware Accelerator 307 can contain logic to allow multiple operations to be conducted fast. For an example of the types of operations that can be handled in hardware to allow fast encryption and decryption see the publication of the National Institute of Standards and Technology in this link: http://nvlpubs.nist-.gov/nistpubs/FIPS/NIST.FIPS.197.pdf In the specific situation of the AES 256 algorithm the same key is used for encryption and decryption thus the reason why the AES 256 algorithm is called "symmetric". To this day the AES 256 algorithms is considered virtually unbreakable and the only documented ways in which this algorithm has been hacked is with the use of partial information obtained from the users of a computer system.

If we choose the secondary security process then the system will decrypt the first layer of the message at 510, then the second layer at 511 and so on until all the cascaded n encryption layers have been decrypted at 512. At this point if the secret encrypted message matches what our Processor 302 contains in its memory at step 513 then we can be confident of the authenticity of the sources requesting access otherwise the transaction is ended. If authenticity is verified then passage of a payload of data and or commands is allowed from the Internet User 208 to the Isolated Computer.

It is to be noted that the Processor 302 can be implemented as a class of processors known as Cryptoprocessors where the internal operations and the instruction set of the processor are themselves encrypted. Also the substantial reliance on logic hardware and state machines serves to increase security since Malware software and related attacks will have difficulty in accessing the system as hardware can only act in the way it was wired to perform a given function. The second process of decoding an encrypted message to compare it with a previously stored message adds a substantial amount of security which is of key importance in critical installations especially in the case of industrial control systems for infrastructure such as power plants water management systems, dams, server farms and networks.

With the establishment of the Internet, the advent of cloud computing and the development of a multiplicity of methods for wireless communications industry has enabled the use of remote devices used to remotely monitor and control processes, and machines. These remote devices are known as Internet of Things (IoTs). IoTs include hardware with embedded software used to monitor sensors, property, appliances, TVs, equipment, animals, industrial controls, etc. Such remote devices may be part of or associated with the machines 109 of FIG. 1 for example. In this disclosure, an IoT will be defined as a hardware device remote from one or more computer systems or devices and in communication with the one or more computer systems or devices over a computer network, containing processing circuitry that interfaces with sensors and/or actuators used to monitor physical and/or logical variables, and/or used to control processes, and which contains software which configures the hardware to perform its monitoring and/or control functions. The software used to control the IoT operation may be referred to as firmware since it is stored in the memory hardware of the IoT. The firmware is used to support the IoT operation, in order to maintain and remotely control a process, a machine, or perform a maintenance operation. The IoT becomes useful when installed as part of an IoT System where the IoT communicates through a computer network with a Server computer from which software instructions can be sent to the IoT and where databases and management portals can be placed for users to effect changes to the functions of the IoT and to monitor processes reported by the IoT representing information from sensors. The Server computer system can host hardware and software in what is known as a server farm with operations known as Cloud Computing. The presently disclosed invention relates to the protection of the IoTs and the processes used in an IoT System in order to prevent malfunction generated from an adversarial intrusion commonly known as a Cyber-attack.

Figure 6:
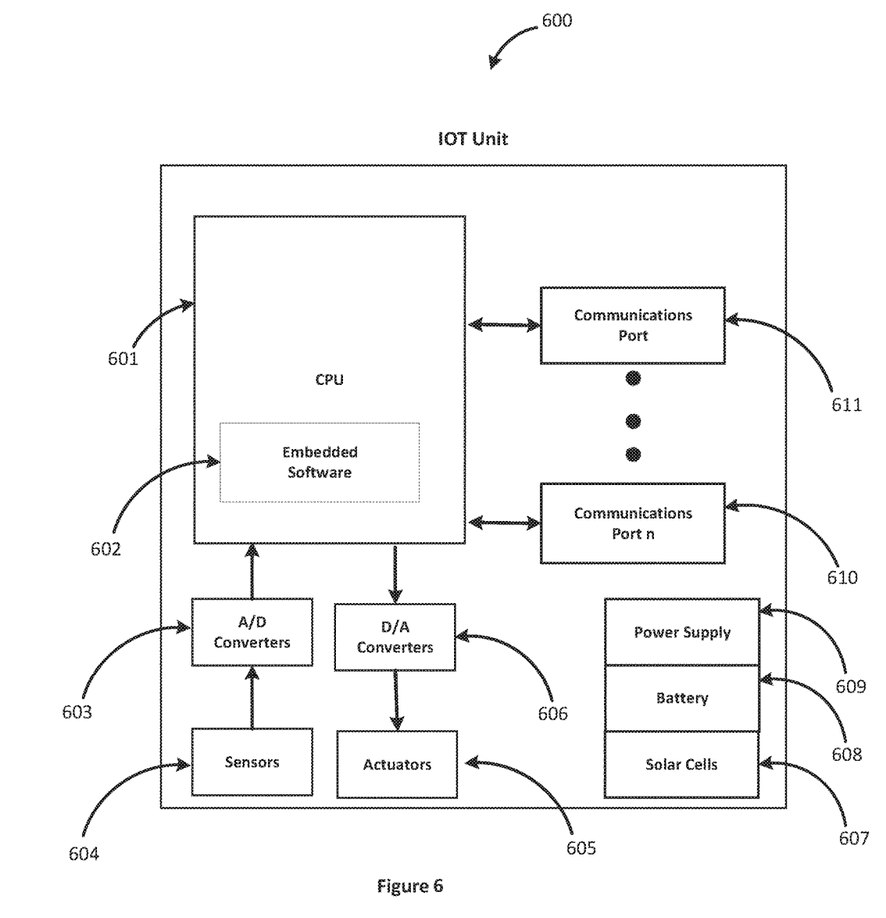
FIG. 6 shows an IoT system comprising an IoT hardware device and its associated firmware used to control its operation.

FIG. 6 illustrates a general diagram for an IoT 600. The unit consists of a main controller with a Central Processing Unit (CPU). The CPU can be implemented with a general purpose microprocessoror as part of a Microcontroller, a Microprocessor or logic in a Field Programmable Gate Array for example. The CPU contains embedded firmware 602 that is executed by the CPU to perform the various processes to operate the IoT and to perform Cybersecurity processes. The embedded firmware may be advantageously stored in a non-volatile memory on the same chip as the processor core itself, or may be stored in a separate memory chip connected to the CPU such as a ROM or EEPROM for example. The IoT contains Analog to Digital converters 603 used to digitize sensors 604. Sensors can be any one of a multiplicity of transducers with analog outputs or digital outputs to sense pressure, temperature, light, GPS location, motion detection, RFID tags, proximity, cameras, sound or any other source of information local to the IoT. The A/D Converters digitize analog data or pass through digital information to the CPU so the embedded firmware can determine a course of action, make decisions and communicate the information to the Server. The IoT can contain or control actuators 605 used to operate physical devices for control purposes. The actuators can be for example motors, switches, relays, or logic gates. The actuators can be activated by the CPU with the use of Digital to Analog Converters (D/A Converters) 606, which can also be a digital port coming out of the CPU. The IoT can include means to provide power to the electronics by using solar cells 607, a battery 608 and an associated power supply 609 used to convert the power to a level that is compatible with the IoT electronics communication devices. The IoT also contains a set of communication ports from port 1, 611 to port n, 610.

The communications ports can be cell communications modems, satellite modems, and Wi-Fi wireless, Bluetooth, radio and other wireless standards or a wired Ethernet connection. Since the IoT needs to establish bidirectional communication to the outside of the device and eventually to a cloud Server to send and receive information, the firmware in the IoT device can be attacked if someone uses the device's communication capabilities either wireless or through a cable connection. This makes the use of cybersecurity protection necessary.

The apparatus and methods described herein are especially applicable when the CPU is a general purpose microprocessor that runs a well-known operating system such as Android or Windows. These are the kinds of systems that are the subject of continuous attack by hackers, and contain vulnerabilities that are regularly exploited. Recent schemes to protect IoT devices from cyber-attacks use dedicated integrated circuits to handle some security functions. However, with a layered security approach as described herein, security can be handled adequately without the need for some or even any of this type of dedicated security hardware separate from the CPU chip.

There are multiple ways in which an IoT can be protected by firmware associated with the CPU. One possibility is to obfuscate the code. Obfuscation may be done with procedures carried out to make the code difficult for humans to understand. Obfuscated code may for example substitute characters or commands and mix up the order of commands to be executed by the CPU. There are programs that can be used for this purpose. Some cyber-attacks send commands with data that exceeds the required length of parameters of the command. This causes what is known as buffer overflow which is used by malware to insert executable commands which are harmful. Measures can be taken in the firmware to prevent the overflow.

Figure 7:
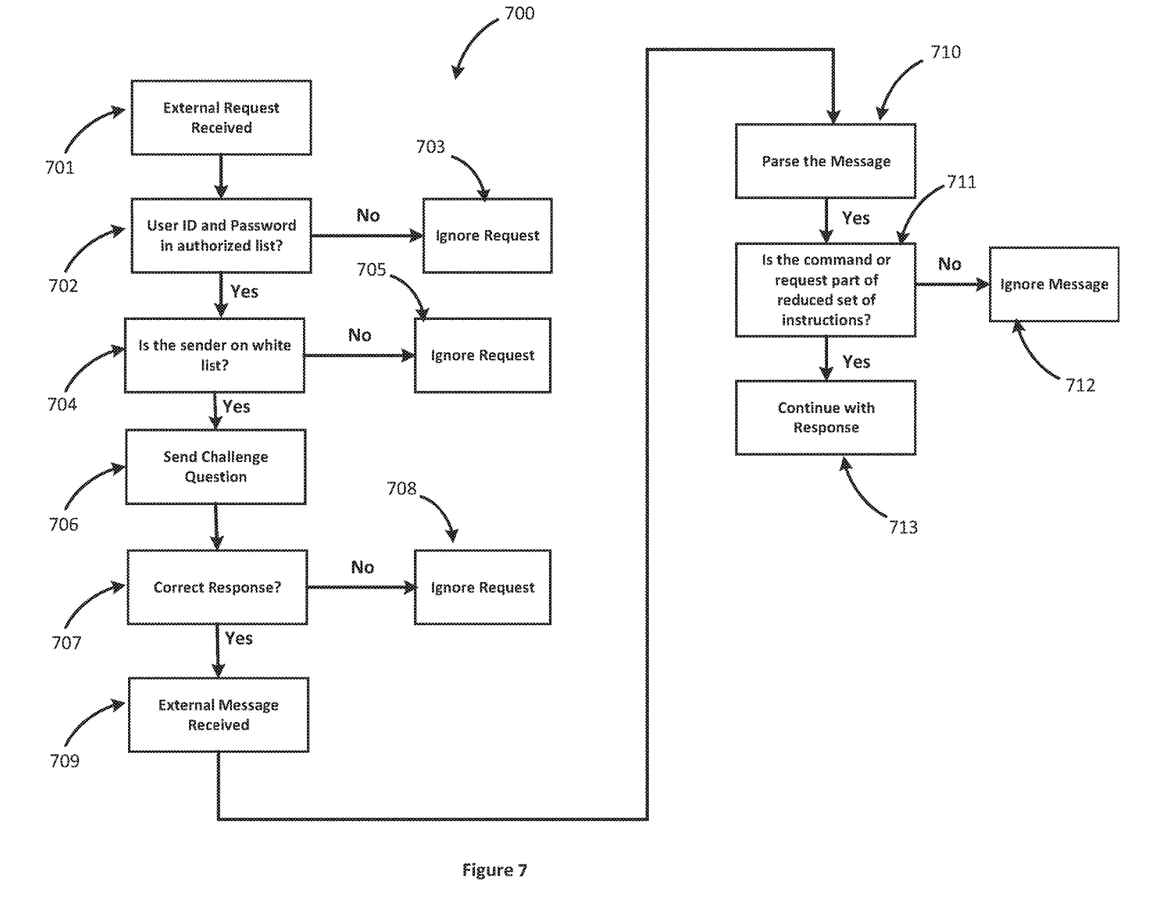
FIG. 7 is a flowchart that displays the processes executed by the IoT hardware to protect the IoT from Cyber intrusions.

Another aspect of the embodiments herein relate to methods used by the IoT device to limit access only to authorized personnel. FIG. 7, 700 illustrates a process used by the IoT to achieve cybersecurity protection. This can include several checks. At 701 an external command is received by the CPU. The IoT is initially loaded with a set of acceptable credentials required for access by an authorized user. At 702 a required user ID and password are received by the IoT hardware and the CPU performs a check at 703 to determine is these credentials are acceptable to the IOT. Passwords used can be dynamic so the IOT can be periodically updated so that the user credentials are continually renewed. If the credentials are not acceptable the request is simply ignored. I the credentials are acceptable, the process then continues. A white list is a list of acceptable internet protocol addresses corresponding to a given user computer. At 704 a check is performed to determine if the user IP address is on a white list previously stored in the IoT. If the IP address is not on the white list the CPU ignores the request at 705. If the IP address is on the white list we continue at 706 and send the requester system a challenge question at. The challenge question can be a set of alphanumeric characters and is meant to be part of an exchange from one machine to another machine, i.e. between the IoT and the Server. At 707 the response to the challenge question is evaluated. If the requester provides an incorrect response the request is ignored at 708. A correct response to the challenge question can be any predetermined word or character that has been previously sent to the requester which corresponds to the challenge question. For example, if the challenge question is "What is Washington", an appropriate response could be a response related to President George Washington such as "Served until Mar. 4, 1797". With a correct challenge question response then the system accepts the message at 709, and then proceeds to parse the message at 710. Once the message is parsed the system at 711 determines if the command or message is part of a set of acceptable instructions. This is also what is known as a white list for commands or messages. If the command or message at 711 is not on the white list, then the message is ignored at 712. If the command or message is on the white list then the system will accept the message or command at 713 and the IoT unit then determines the source can be trusted and continues with communication. At any point the system may continue to check to make sure further messages during a given session are on the white list in terms of the command or related parameters. As explained above, there are multiple combinations of measures that can be taken in the IoT to achieve a high degree of security.

Figure 8:
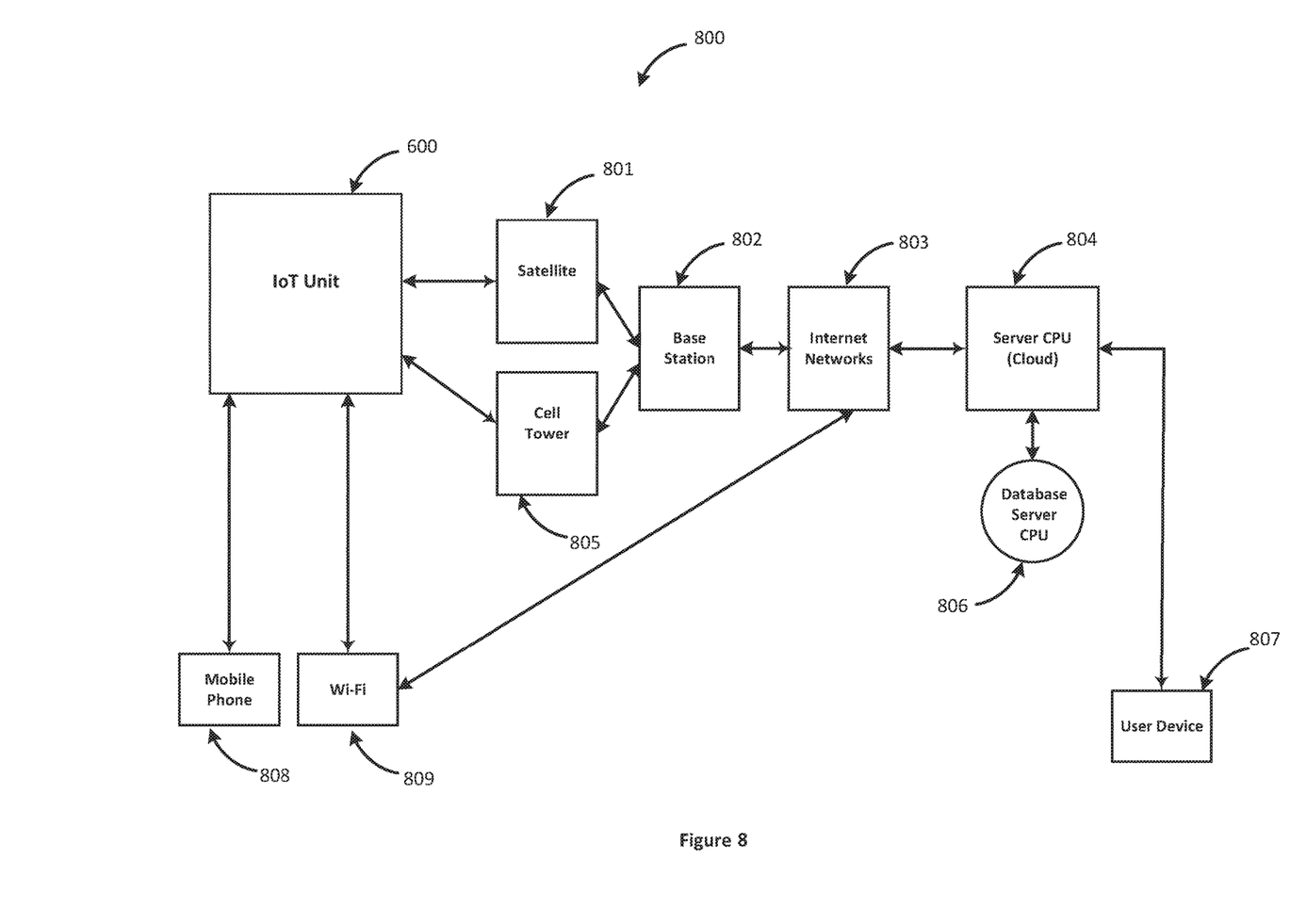
FIG. 8 shows an IoT System used to communicate with a Server computer where the IOT and the Server connect through various means to send and receive information and to control the IoT.

FIG. 8 illustrates a model of an IoT System. This System consists of an IoT unit and all other devices and hardware used to enable communication from the IoT to a Server. The IoT can communicate to a satellite 801 or to a Cell Tower 805 using wireless communications. These facilities in turn relay the communications channel to a Base Station 802 on land. The Base Station in turn connects the communications channel to Internet Networks 803. These networks send the information to multiple connections which eventually connect the communications channel to a target Server CPU 804 which is the Server that is used to store information from the IoT and to send commands and control to the IoT unit. The Server CPU can be located in a facility where there are many other computers where the Server CPU is provided as a service. A facility of this type is also known as a server farm and the data stored in the location is known as the cloud or cloud storage. Server CPU 804 stores information pertaining the status and health of the IoT device 600 and also sends commands to the IoT so that it can report back to the server local information regarding sensors and the operation of the electronics in the device. The Server stores sensor information received from the IoT in a Database Server CPU 806. In addition, the Server CPU and use portals similar to an Internet browser to display the IoT sensor information and to allow a remote user to determine the status of the IoT such as location, battery status. A remote human user can access IoT information with s User Device 807 such as a computer, laptop or a mobile phone. The IoT may also communicate to other external devices such as a Mobile Phone 808 using a Bluetooth communication channel, which can provide a convenient way to obtain information from the IoT locally. Other ways for the IoT to communicate are with the use of a Wi-Fi connection 809 which can readily connect the IoT to a wired communication channel to Internet Networks 803.

Figure 9:
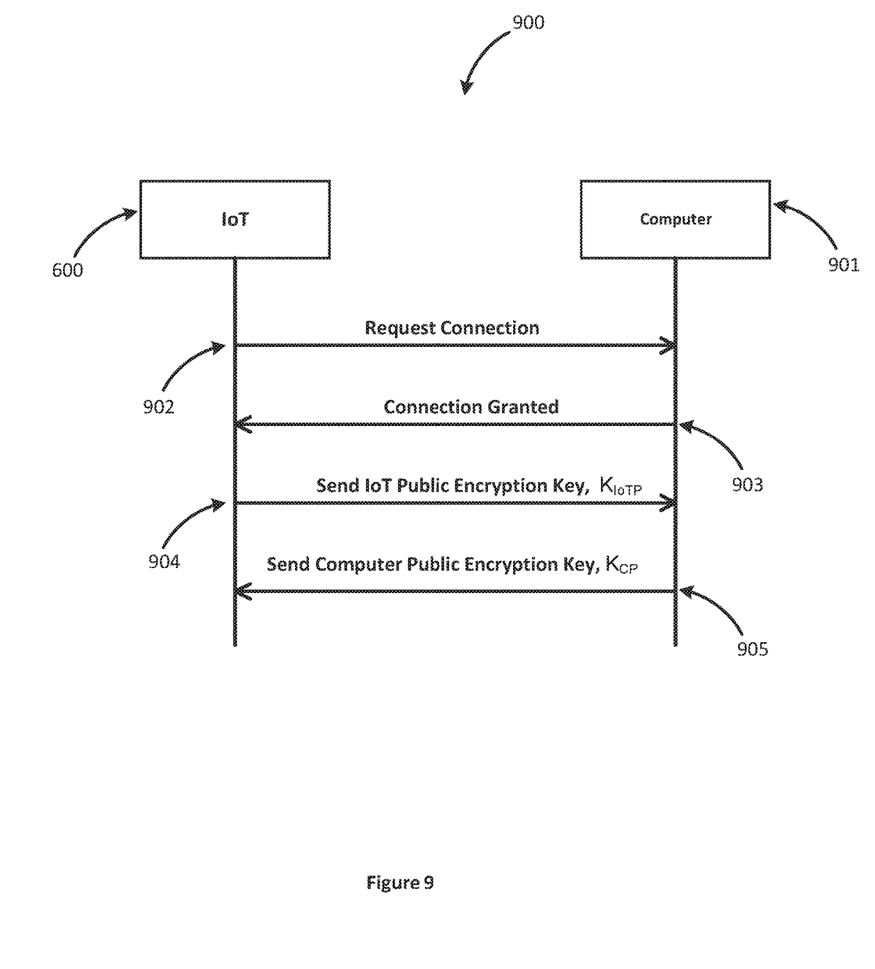
FIG. 9 is a description of a process used by an IoT to communicate with a Server computer using encrypted communications.

FIG. 9, 900 shows the process used by the IoT System to establish a secured communications channel. The IoT unit 600 in this illustration initiates the communication with a remote Computer 901. The remote computer may be a Server, a mobile phone, or a general computer that can connect to the communications channel. The communications channel can the Internet although a similar process can be used for local wired communications. In step 902 the IoT 600 requests communication with the Computer 901. In step 903 the Computer grants the connection. A Public Encryption Key is generally a long set of alphanumeric characters that is used by an algorithmic process to encrypt a message. In Symmetric Encryption the same key is used to encrypt and decrypt a message. At 904 the IoT sends its public key $K_{IoTP}$ to the server, which the server in turn will use to encrypt messages that need to be sent to the IoT. For any message the IoT receives back from the Computer, the IoT will use this same $K_{IoTP}$ public key to decrypt the message. In step 905 the Computer 901 will send its Public Encryption Key $K_{CP}$ to the IoT. For any message the Computer 901 receives back from the IoT, the Computer will use this same $K_{CP}$ public key to decrypt the message. There are other methods used to exchange encrypted messages including Asymmetric Encryption where two keys are generated by each side of the communications channel.

Secured messages exchanged over the Internet connection are Hypertext Transfer Protocol over SSL (Secure Socket Layer), also known as https HTTPS. Another method of secured communications include a Virtual Private Network tunnels (VPNs). In this invention we can make use of any of these measures to secure the IoT to and the IoT System from intrusion and eavesdropping by an attacker.

In the IOT System the Server 804 is also protected from intrusions with installed antimalware software and firewalls to prevent intrusion from an unauthorized source to the Server and potentially our IoT unit. Furthermore the information stored in the Database Server CPU 806 can be also encrypted as it is placed in the database by the operating system of the server 804. This type of database encryption is known as Data at Rest Encryption.

The above described an IoT System that contains the necessary features that will ensure protection against Cyber-attacks.

Each hardware element of the IoT System contains the necessary software processes needed to achieve the protection. In addition to the encryption generally used to establish the secured communication channel and countermeasures used by the Server, the IoT System may implement a Cascaded Encryption, which consists of additional layers of encryption. In this case an encrypted message is encrypted multiple times with different encryption keys. Specialized hardware accelerators can be included with the IoT device and the Server to be able to rapidly decrypt the messages. However, since a potential attacker does not know the encryption keys or the algorithms used to produce them this presents a substantial barrier since the potential attacker would have to break through multiple layers of encryption with have available a significant level of computer capabilities in order to be able to discern any useful information.

The IoT System can contain other User Devices 807, such as a PC or Laptop 807, a Mobile Phone 808, which can also have installed similar security communication measures with encryption as previously described.

Variations of Cybersecurity techniques described in the embodiments presented can use combined in order to protect the IoT System hardware from unwanted intrusions and will provide a given installation with safe, reliable and effective operations.

The previous description of the disclosed embodiments is provided to enable the construction and use f the present invention. The embodiments can be installed in a variety of architectural configurations. Various modifications to these embodiments are possible and within the scope of the invention.

The invention claimed is:

1. An internet of things (IoT) sensor device comprising:
    a sensor configured to collect monitoring data for a system proximate to the IoT sensor device;
    at least one central processing unit (CPU) in communication with the sensor; and
    firmware stored in a memory communicatively coupled with the CPU that causes the CPU to obtain the monitoring data from the sensor, and to communicate, via a network, with a remote computer system at an address of the network that is remote from a network address of the network for the IoT sensor device;

wherein the firmware is configured to establish a secured communication channel to communicate with the remote computer system via the network, the secured communication channel being secured by cascaded encryption operations, wherein the firmware is further configured to establish the secured communication channel by:

sending a connection request to the remote computer system;

sending a first encrypted message comprising a first encrypted data payload including an IoT device public encryption key to the remote computer system in response to the connection request being granted;

receiving, from the remote computer system, a second encrypted message comprising a second encrypted data payload including a computer public encryption key;

receiving one or more subsequent encrypted messages from the remote computer system, each subsequent encrypted message comprising a subsequent encrypted data payload including control data associated with the sensor;

responsive to receiving the one or more subsequent encrypted messages, decrypting the data payloads included in the one or more subsequent encrypted messages using the IoT device public encryption key;

encrypting one or more additional encrypted messages to be sent to the remote computer system using the computer public encryption key and at least a second layer of encryption, each additional encrypted message comprising an additional encrypted data payload including monitoring data obtained from the sensor; and sending the one or more additional encrypted messages to the remote computer system;

wherein each encrypted message is encrypted with at least two different layers of encryption.

2. The IoT sensor device of claim 1, further comprising a hardware accelerator for encryption and/or decryption functions.

3. The IoT sensor device of claim 1, wherein the firmware is stored in a non-volatile memory on the same chip as the CPU itself.

4. The IoT sensor device of claim 1, wherein the memory stores information related to the identity of users authorized to receive the monitoring data from the IoT sensor device.

5. The IoT sensor device of claim 1, wherein the memory stores information related to the identity of users authorized to control the IoT sensor device.

6. The IoT sensor device of claim 5, wherein the information related to the identity of users authorized to control the IoT sensor device comprises one or more passwords.

7. The IoT sensor device of claim 5, wherein the information related to the identity of users authorized to control the IoT sensor device comprises one or more whitelisted internet protocol (IP) addresses.

8. The IoT sensor device of claim 5, wherein the memory stores a set of one or more whitelisted instructions.

9. The IoT sensor device of claim 1, wherein the firmware is obfuscated.

10. The IoT sensor device of claim 1, wherein the firmware is stored in a non-volatile memory on the same chip as the processor core itself.

11. The IoT sensor device of claim 1, further comprising encryption hardware communicatively coupled with the CPU, wherein said encrypting and said decrypting is performed in part by the encryption hardware.

12. The IoT sensor device of claim 1, wherein the firmware further causes the CPU to:

detect receipt of the control data from the remote computer system; and transmit a control message to an actuator of the system proximate to the sensor, wherein the control message adjusts the system proximate to the sensor according to the control data.

\* \* \* \* \*